(12) United States Patent
McNair

(10) Patent No.: US 11,361,078 B2
(45) Date of Patent: Jun. 14, 2022

(54) HIERARCHICAL INTEGRATED TRUST ASSESSMENT

(71) Applicant: Bell Helicopter Textron Inc., Fort Worth, TX (US)

(72) Inventor: Michael Kevin McNair, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 538 days.

(21) Appl. No.: 16/148,725

(22) Filed: Oct. 1, 2018

(65) Prior Publication Data

US 2020/0104501 A1 Apr. 2, 2020

(51) Int. Cl.
*G06F 21/57* (2013.01)
(52) U.S. Cl.
CPC ........ *G06F 21/57* (2013.01); *G06F 2221/031* (2013.01); *G06F 2221/032* (2013.01)
(58) Field of Classification Search
CPC .............. G06F 21/57; G06F 2221/032; G06F 2221/031; G06F 21/577
USPC .......................................................... 726/22
See application file for complete search history.

(56) References Cited

U.S. PATENT DOCUMENTS

| 6,775,779 | B1 * | 8/2004 | England | G06F 21/57 |
| | | | | 705/51 |
| 10,235,523 | B1 * | 3/2019 | Keller, III | G06F 13/4282 |
| 2006/0036851 | A1 * | 2/2006 | DeTreville | G06F 9/4406 |
| | | | | 713/159 |
| 2014/0082352 | A1 * | 3/2014 | Howry | G06F 21/57 |
| | | | | 713/157 |
| 2014/0368435 | A1 * | 12/2014 | Abzarian | G06F 3/0237 |
| | | | | 345/168 |
| 2017/0346640 | A1 * | 11/2017 | Smith | H04L 9/14 |
| 2019/0303743 | A1 * | 10/2019 | Venkataramani | G06F 9/3834 |

OTHER PUBLICATIONS

Peter Gabriel Neumann. On Hierarchical Design of Computer Systems for Critical Applications. Sep. 1986. IEEE Transactions on Software Engineering. vol. SE-12, No. 9. pp. 905-920 (Year: 1986).*

Jia Guo, Ing-Ray Chen. Jeffrey J.P. Tsai. Hamid Al-Hamadi. A Hierarchical Cloud Architecture for Integrated Mobility, Service, and Trust Management of Service-Oriented IoT Systems. 2016. The Sixth International Conference on Innovative Computing Technology (INTECH 2016). pp. 72-77 (Year: 2016).*

* cited by examiner

*Primary Examiner* — Kambiz Zand
*Assistant Examiner* — Aubrey H Wyszynski
(74) *Attorney, Agent, or Firm* — Lightfoot & Alford PLLC

(57) ABSTRACT

A hierarchical integrated trust assessment system features nested subsystems. Each subsystem utilizes a trust module for validating input data to the subsystem, validating output data from the subsystem, and validating the operation of the subsystem itself. The trust module verifies the format, the authenticity, the content of the inputs to the subsystem. The scope of each trust module is minimized to the associated subsystem. Minimizing the scope of the trust module results in increased reliability of the trust module's decisions.

14 Claims, 4 Drawing Sheets

HIERARCHICAL INTEGRATED TRUST ASSESSMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Modern day aircraft require their avionics systems to be reliable because so much of the actual control of the aircraft is done by parts of the avionics system. Some conventional avionics systems utilize a centralized trust assessment module. The centralized trust assessment module is configured for accepting all of the inputs for an entire system comprised of multiple subsystems. A centralized trust assessment module limits the robustness of the system. When the centralized trust assessment module is communal, each subsystem must rely on the outputs from other subsystems without the ability to make trust assessments based on other subsystems. For example, when a parental subsystem fails or is compromised, a child subsystem cannot make a trust determination regarding whether the parent's subsystem output is trustworthy, whether the parent's subsystem output should be disregarded, or whether the parent's subsystem output should be replaced. Therefore, limitations exist in conventional centralized trust assessment modules.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure teaches a hierarchical integrated trust assessment system (HITAS) that locally assesses elements of an aircraft's subsystem. Those elements include inputs to the aircraft subsystem, outputs of the aircraft subsystem, and the state of the aircraft subsystem itself. The HITAS verifies that the aircraft subsystem is receiving good data and is not being spoofed. The HITAS further verifies that the aircraft subsystem is generating good data and that the control signals are being processed within a selected set of bounds and within a selected set of expectations. The HITAS can override a faulty subsystem and provide a better quality output data stream. The trust module verifies the format, the authenticity, and the content of the inputs to the subsystem. A trust module of the HITAS verifies the subsystem behavior is appropriate. Additionally, the trust module ensures that a trusted subsystem featuring a trust module can be certified by regulatory agencies. Certifying subsystems instead of entire aircraft allows subsystems to be replaced and upgraded over time without recertifying the entire aircraft at great time and expense.

Figure 1:
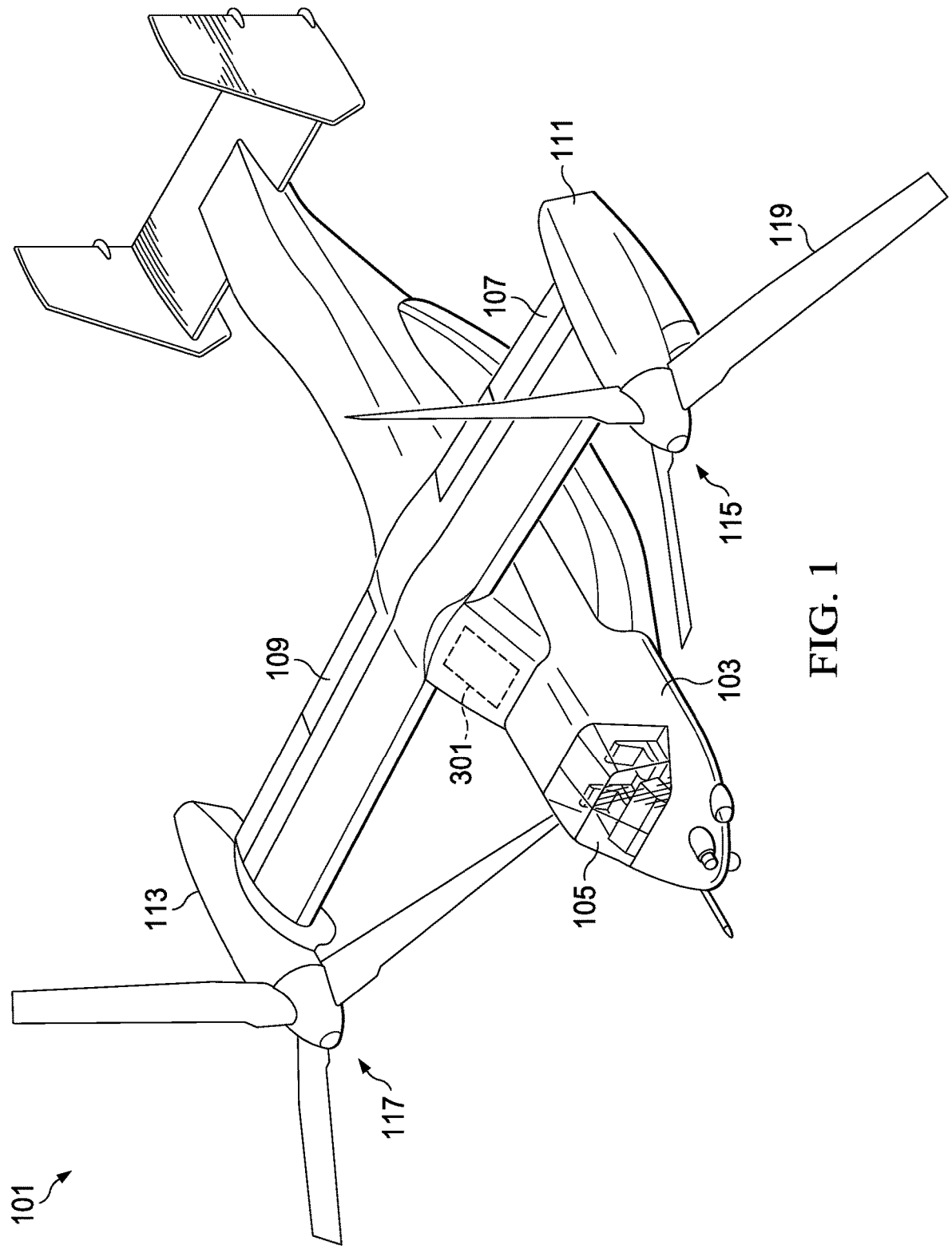
FIG. 1 is an oblique view of a tiltrotor aircraft according to this disclosure.

FIG. 1 illustrates a tiltrotor aircraft 101 equipped with a HITAS 301 according to this disclosure. Aircraft 101 has a fuselage 103 with a cockpit 105 located in a forward portion of fuselage 103. Wings 107, 109 are attached to fuselage 103, and engine nacelles 111, 113 one rotatably attached to the outer end of each wing 107, 109, respectively. Each nacelle 111, 113 houses an engine (not shown), which is operably connected to a rotatable proprotor 115, 117. Each proprotor 115, 117 comprises three blades 119. Proprotors 115, 117 rotate in opposite directions and comprise similar components, though components in proprotors 115, 117 may be constructed and/or installed in a mirror, or reverse, manner from the opposite proprotor 115, 117. Aircraft 101 requires a plurality of flight control computers in conjunction with pilot inputs to fly the aircraft. Flight control computers rely on various sensors, such as pilot static airspeed, gyroscopes, global positioning sensors, accelerometers, thermocouples, etc. for conditional information into the flight control computers. An example is the flight control computer's use of airspeed to vary the speed of proprotors 115,117. An airspeed system features a portion of a HITAS 301 before the airspeed data is passed to the flight control computers. The flight control computers also feature a portion of the HITAS 301. The HITAS 301 can verify the airspeed data is within an expected range.

Figure 2:
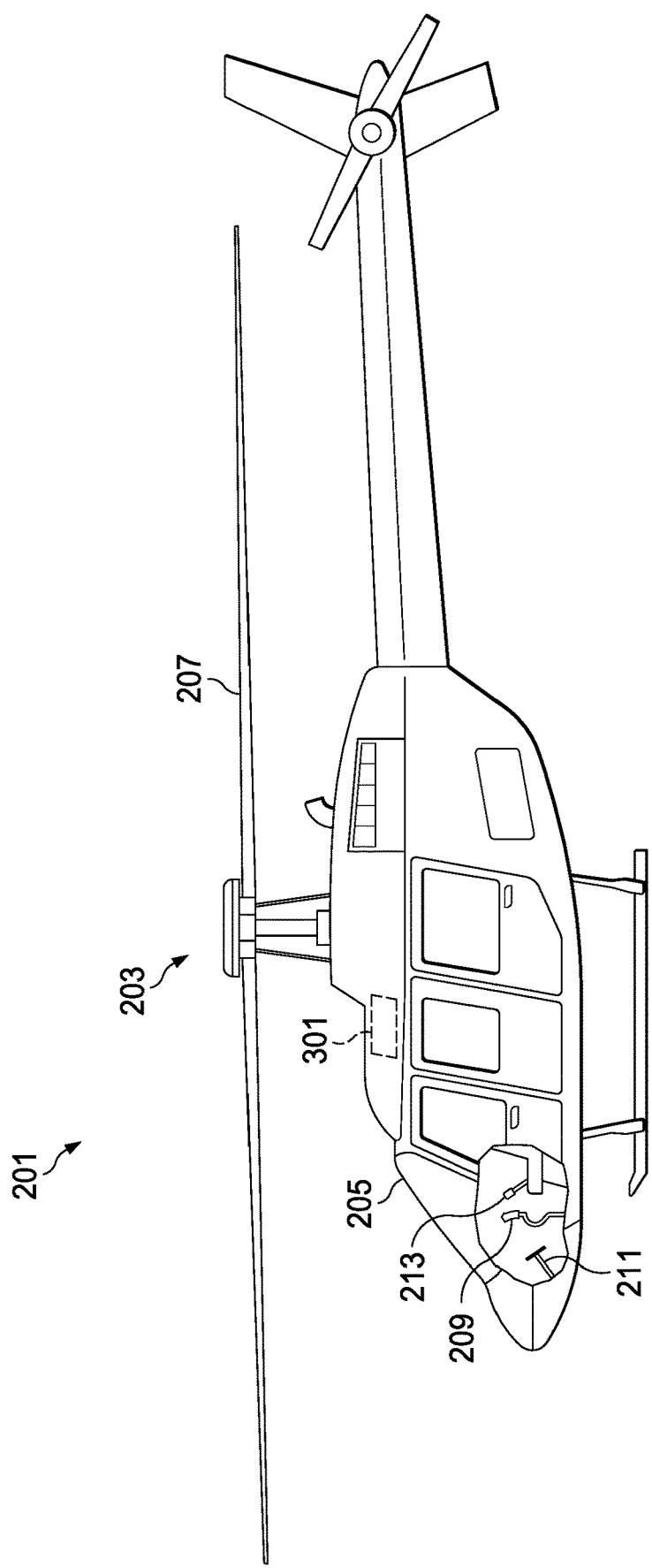
FIG. 2 is a side view of a rotorcraft according to this disclosure.

FIG. 2 illustrates a rotorcraft 201 equipped with a HITAS 301 according to this disclosure. Rotorcraft 201 comprises a rotary system 203 carried by a fuselage 205. One or more rotor blades 207 operably associated with rotor system 203 provide flight for rotorcraft 201 and are controlled with a plurality of control sticks within fuselage 205 feeding inputs into a flight control computer. For example, during flight a pilot can manipulate the cyclic stick 209 to change the pitch angle of rotor blades 207, thus providing lateral and longitudinal flight direction, and/or manipulate pedals 211 for controlling yaw direction. Furthermore, the pilot can adjust the collective stick 213 to change the pitch angles of all of the rotor blades concurrently. The sticks and pedal movements are measured by potentiometer systems. The potentiometer systems feature a portion of the HITAS 301 and determines whether the data from the potentiometers is to be trusted by determining if the data is within a selected set of bounds. The trusted data is then provided to a flight control system also having a portion of the HITAS 301. The flight control system does not determine the validity of the actual potentiometer data because the actual potentiometer data was trusted in the potentiometer system. Therefore, the flight control system or computer has a much narrower scope than it would have conventionally.

Figure 3:
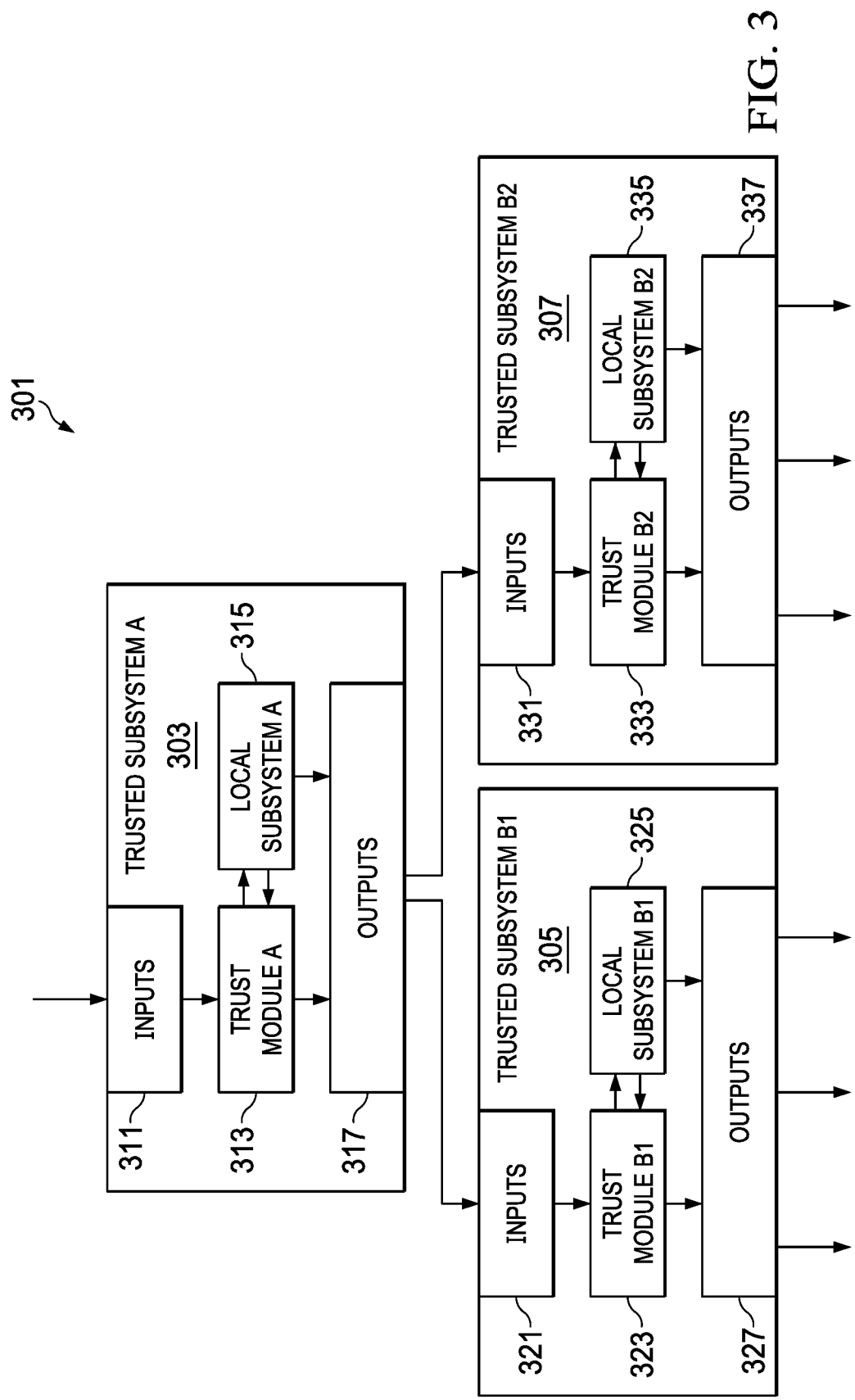
FIG. 3 is a schematic view of a hierarchical integrated trust assessment system according to this disclosure.

FIG. 3 illustrates a HITAS 301. HITAS 301 is comprised of a trusted subsystem A 303, a trusted subsystem B1 305, and a trusted subsystem B2 307. Each subsystem of the HITAS 301 has been certified independently by a regulatory agency, such as the FAA, so that as one subsystem is replaced and upgraded only the new subsystem needs certification and not all of the subsystems of the aircraft.

Trusted subsystem A 303 is comprised of a subsystem A set of inputs 311, a trust module A 313, a local subsystem A 315, and a subsystem A set of outputs 317. The subsystem A set of inputs 311 is comprised of all types and forms of data fed into the trusted subsystem A 303. Typically, the subsystem A set of inputs 311 is comprised of several varied streams of data such as voltage outputs from sensors, bus data, control signals, signal streams, data commands, data replies, video streams, discrete values, and other forms of data. Typically, set of input 311 is comprised of control data along with signal data. Trust module A 313 reviews all inputs from the subsystem A set of inputs 311 to determine whether incoming data is correct and within expectations. Trust module A 313 determines if incoming data should be passed onto the local subsystem A 315. Trust module A 313 is also provided with feedback from the local subsystem A 315 in making trust assessments. In those instances where the trust module A 313 does not trust the local subsystem A 315, the trust module A can override the output of the local subsystem A 315 and replace the untrusted output of the local subsystem A 315 with another. Outputs from the trust module A 313 and from the local subsystem A 315 form subsystem A set of outputs 317. Trust modules can be physically distinct components connected to a subsystem either electrical, mechanically, or both. Trust modules also can be a software component that is executed either within a processor of the subsystem or physically separate from it.

Trusted subsystem B1 305 is comprised of a subsystem B1 set of inputs 321, a trust module B1 323, a local subsystem B1 325, and a subsystem B1 set of outputs 327. The subsystem B1 set of inputs 321 is comprised of all types and forms of data fed into the trusted subsystem B1 from the subsystem A set of outputs 317. Typically, the subsystem B1 set of inputs 321 is comprised of several varied streams of data such as voltage outputs from sensors, bus data, data commands, data replies, video streams, discrete values, and other forms of data. Trust module B1 323 reviews all inputs from the subsystem B1 set of inputs 321 to determine whether the incoming data is correct and if that incoming data should be passed onto the local subsystem B1 325. Trust module B1 323 is also provided with feedback from the local subsystem B1 325 in making trust assessments. Outputs from the trust module B1 323 and from the local subsystem B1 325 form subsystem B1 set of outputs 327.

Trusted subsystem B2 307 is comprised of a subsystem B2 set of inputs 331, a trust module B2 333, a local subsystem B2 335, and a subsystem B2 set of outputs 337. The subsystem B2 set of inputs 331 is comprised of all types and forms of data fed into the trusted subsystem B2 from the subsystem A set of outputs 317. Typically, the subsystem B2 set of inputs 331 is comprised of several varied streams of data such as voltage outputs from sensors, bus data, data commands, data replies, video streams, discrete values, and other forms of data. Trust module B2 333 reviews all inputs from the subsystem B2 set of inputs 331 to determine whether the incoming data is correct and if that incoming data should be passed onto the local subsystem B2 335. Trust module B2 333 is also provided with feedback from the local subsystem B2 335 in making trust assessments. Outputs from the trust module B2 333 and from the local subsystem B2 335 form subsystem B2 set of outputs 337.

In this embodiment, trusted subsystem B1 305 does not rely upon trusted subsystem B2 307. Therefore, the scope of the trust module in each of the trusted subsystem B1 305 and the trusted subsystem B2 307 is narrowed as compared to trusted subsystem A 303 because they are isolated from each other. The narrowing of scope reduces the workload associated with making trust assessments. Furthermore, the trust module B1 323 can make trust assessments on the data provided by the trusted subsystem A 303. For example, if local subsystem A 315 fails and starts generating erroneous data as output, the trust module B1 can determine the data provided by trusted subsystem A 303 is flawed. Once the trust module B1 flags the data from trusted subsystem A 303 as flawed, trusted subsystem B1 305 can treat the erroneous data in several ways. For example, the trusted subsystem B1 305 can scale data differently thereby reducing the effect of erroneous data. Alternatively, the trusted subsystem B1 305 can alert lower subsystems of the erroneous data. The trust modules 313, 323, 333 are typically a preprocessor that ensures data and control signals are being processed within a set of bounds and within a set of expectations. The trust module utilizes elements such as neural networks, decision trees, artificial and machine intelligence methods, bounds checking, and other techniques rooted in software, firmware, and/or hardware to verify the incoming and the provided inputs.

Figure 4:
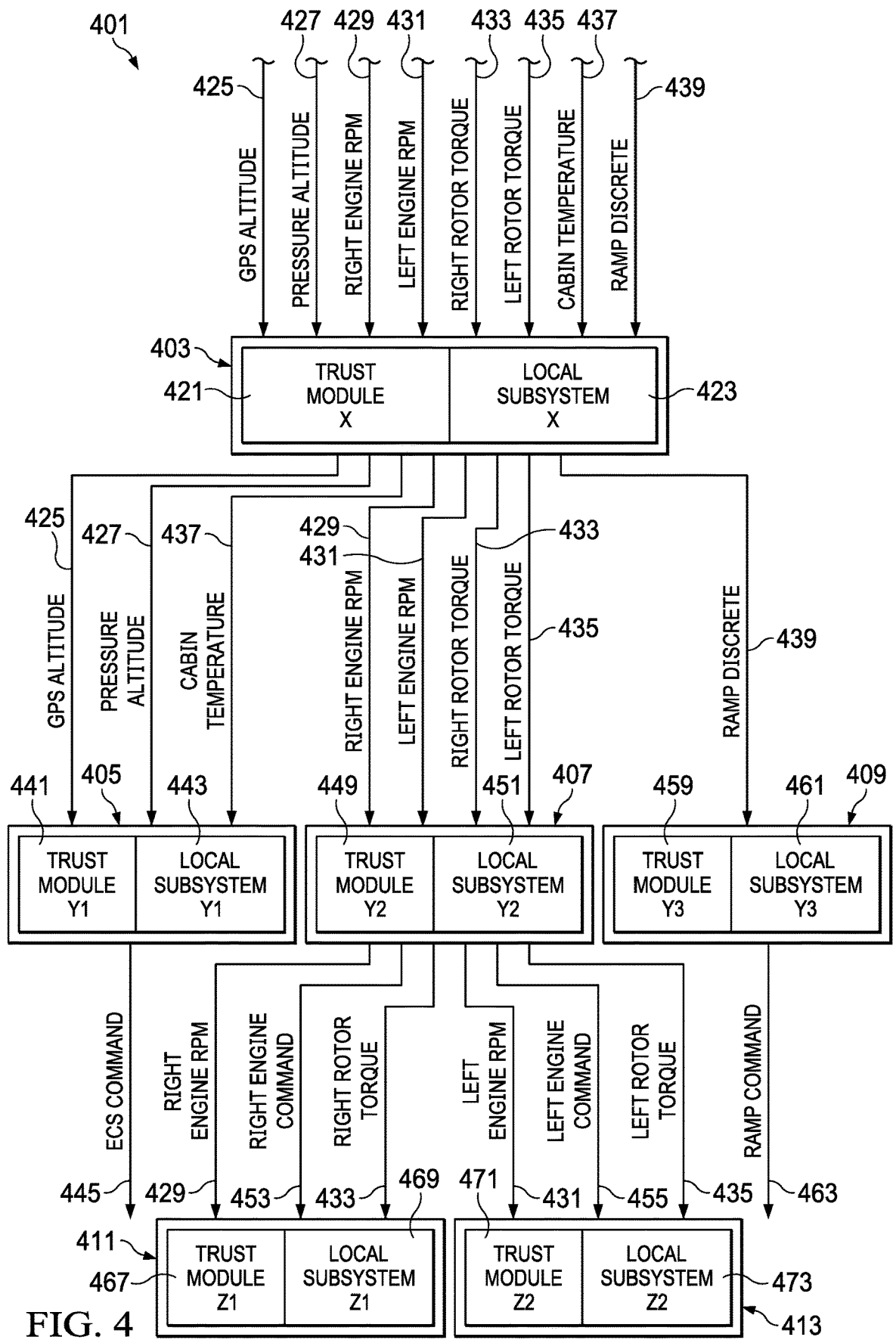
FIG. 4 is a schematic view of a hierarchical integrated trust assessment system according to this disclosure.

FIG. 4 illustrates a hierarchical integrated trust assessment system (HITAS) 401. HITAS 401 is comprised of a trusted subsystem X 403, a trusted subsystem Y1 405, a trusted subsystem Y2 407, a trusted subsystem Y3 409, a trusted subsystem Z1 411, and a trusted subsystem Z2 413. In this embodiment, a plurality of inputs is fed into a subsystem with a higher order and then dispersed into further subsystems with lower orders as needed. Each subsystem is limited in scope such that only pertinent data for a trust assessment is provided to the subsystem.

Trusted subsystem X 403 is comprised of a trust module X 421 in cooperation with local subsystem X 423. A plurality of data streams are provided into the trusted subsystem X 403, including a GPS measured altitude 425, a pressure measured altitude 427, a right engine RPM 429, a left engine RPM 431, a right rotor torque 433, a left rotor torque 435, a cabin temperature 437, and a ramp discrete 439. Trust module X 421 reviews the plurality of data streams to make trust assessments for the local subsystem X 423. Bad data streams are annotated as such and can be fixed in some embodiments and replaced in some embodiments. Trusted subsystem X 403 provides data directly to subsystems 405, 407, 409.

Trusted subsystem Y1 405 is comprised of a trust module Y1 441 in cooperation with local subsystem Y1 443. A plurality of data streams is provided into the trusted subsystem Y1 405, including a GPS measured altitude 425, a pressure measured altitude 427, and a cabin temperature 437. Trust module Y1 441 reviews the plurality of data streams to make trust assessments for the local subsystem Y1 433. Local subsystem Y1 443 processes the GPS measured altitude 425, the pressure measured altitude 427, and the cabin temperature 437 to create an ECS command 445. Bad data streams are annotated as such and can be fixed in some embodiments and replaced in some embodiments. Trusted subsystem Y1 405 provides data directly, such as ECS command 445, to environmental systems to vary the cabin conditions. Trust module Y1 441 does not review data from subsystems outside the scope of the trust module Y1. For example, trust module Y1 does not review engine RPMs or whether the ramp is open or closed.

Trusted subsystem Y2 407 is comprised of a trust module Y2 449 in cooperation with local subsystem Y2 451. A plurality of data streams is provided into the trusted subsystem Y2 407, including the right engine RPM 429, the left engine RPM 431, the right rotor torque 433, and the left rotor torque 435. Trust module Y2 449 reviews the plurality of data streams to make trust assessments for the local subsystem Y2 451. Local subsystem Y2 451 processes the right engine RPM 429 and the right rotor torque 433 to create a right engine command 453. Local subsystem Y2 451 processes the left engine RPM 431 and the left rotor torque 435 to create a left engine command 455. Bad data streams are annotated as such and can be fixed in some embodiments and replaced in some embodiments. Trusted subsystem Y2 407 provides engine data directly, such as left engine command 455 and right engine command 453, to engine subsystems to control the right and left engines. Trust module Y2 449 does not review data from subsystems outside the scope of the trust module Y2. For example, trust module Y2 449 does not review cabin temperature 437 or whether the ramp is open or closed.

Trusted subsystem Y3 409 is comprised of a trust module Y3 459 in cooperation with local subsystem Y3 461. A single data stream is provided into the trusted subsystem Y3 409 of the ramp discrete 439. Trust module Y3 459 reviews the data streams to make trust assessments for the local subsystem Y3 433. Local subsystem Y3 461 processes the ramp discrete 439 to create a ramp command 463. Bad data streams are annotated as such by flagging and can be fixed in some embodiments and replaced in some embodiments. Trusted subsystem Y3 409 provides data directly, such as the ramp command 463, to ramp systems to control the condition of the ramp. Trust module Y3 459 does not review data from subsystems outside the scope of the trust module Y3. For example, trust module Y3 459 does not review engine RPMs or cabin temperature 437.

Trusted subsystem Z1 411 is comprised of a trust module Z1 467 in cooperation with local subsystem Z1 469. A plurality of data streams is provided into the trusted subsystem Z1 411, including the right engine RPM 429, the right rotor torque 433, and the right engine command 453. Trust module Z1 467 reviews the plurality of data streams to make trust assessments for the local subsystem Z1 469. Local subsystem Z1 469 processes the right engine RPM 429, the right rotor torque 433, and the right engine command 453 to control the right engine. Bad data streams are annotated as such and can be fixed in some embodiments and replaced in some embodiments. Trusted subsystem Z1 409 provides data directly to the right engine systems to control the right engine. The trust module Z1 467 utilizes elements such as neural networks, decision trees, artificial and machine intelligence methods, bounds checking and other techniques rooted in software, firmware, and/or hardware to verify the incoming and the provided inputs.

Trusted subsystem Z2 413 is comprised of a trust module Z2 471 in cooperation with local subsystem Z2 473. A plurality of data streams is provided into the trusted subsystem Z2 413, including the left engine RPM 431, the left rotor torque 435, and the left engine command 455. Trust module Z2 471 reviews the plurality of data streams to make trust assessments for the local subsystem Z2 473. Local subsystem Z2 473 processes the left engine RPM 431, the left rotor torque 435, and the left engine command 455 to control the left engine. Bad data streams are annotated or flagged as such as flagged data and can be fixed bad in some embodiments and replaced in some embodiments. Trusted subsystem Z2 409 provides data directly to the left engine systems to control the left engine. The trust module Z2 471 utilizes elements such as neural networks, decision trees, artificial and machine intelligence methods, bounds checking, and other techniques rooted in software, firmware, and/or hardware to verify the incoming and the provided inputs.

It should be noted that the hierarchical integrated trust assessment systems increase the reliability of the rotorcraft by minimizing the scope of multiple trust modules comingled across the various subsystems of the rotorcraft. Replacement of subsystems of the hierarchical integrated trust assessment systems can be accomplished without recertification of the entire aircraft. Aircraft subsystems are better protected from spoofing and other malicious attacks because each independent subsystem examines inputs and separately determines whether to trust an input data stream.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft system, comprising:
a first engine and a second engine;
a hierarchical integrated trust assessment system carried by the aircraft, comprising:
  a first trusted subsystem having:
    a first trust module; and
    a first local subsystem of the aircraft;
  wherein the first trust module reviews inputs to the first local subsystem of the aircraft;
  a second trusted subsystem having:
    a second trust module; and
    a second local subsystem of the aircraft;

wherein the second trust module reviews inputs to the second local subsystem of the aircraft from the first trusted subsystem; and a third trusted subsystem having:
  a third trust module; and
  a third local subsystem of the aircraft;
  wherein the third trust module reviews inputs to the third local subsystem of the aircraft from the first trusted subsystem; and wherein the second local subsystem handles inputs related to the first engine but not inputs related to the second engine and wherein the third local subsystem handles inputs related to the second engine but not inputs related to the first engine.

2. The system of claim 1, wherein the first trust module reviews a condition of the first local subsystem of the aircraft.

3. The system of claim 2, wherein the first trust module replaces an output of the first local subsystem of the aircraft based upon the condition of the first local subsystem of the aircraft.

4. The system of claim 1, wherein a scope of the third trust module is limited to both the first trusted subsystem and the second trusted subsystem.

5. An aircraft, comprising:
  a first engine and a second engine;
  a first trusted subsystem carried by the aircraft, the first trusted subsystem comprising:
    at least one first input data stream;
    a first local subsystem;
    at least one first output data stream; and
    a first trust module located between the first local subsystem and the at least one first input data stream;
    wherein the at least one first input data stream is comprised of control data along with signal data; and
    wherein the at least one first output data stream is generated from both the first local subsystem and the first trust module;
  a second trusted subsystem having:
    at least one second input data stream;
    a second local subsystem;
    at least one second output data stream; and
    a second trust module located between the second local subsystem and the at least one second input data stream;
    wherein the at least one second output data stream is generated from both the second local subsystem and the second trust module; and
  wherein the at least one second input data stream is the at least one first output data stream; and
  a third trusted subsystem having:
    at least one third input data stream;
    a third local subsystem;
    at least one third output data stream; and
    a third trust module located between the third local subsystem and the at least one third input data stream;
    wherein the at least one third output data stream is generated from both the third local subsystem and the third trust module;
  wherein the at least one third input data stream is the at least one first output data stream; and
  wherein the third trusted subsystem is isolated from the second trusted subsystem; and
  wherein the at least one second input data stream comprises data regarding the first engine but not data regarding the second engine and wherein the at least one third input data stream comprises data regarding the second engine but not data regarding the first engine.

6. The system of claim 5, wherein the first trust module controls the at least one first output data stream.

7. The system of claim 5, wherein the first trust module monitors the first local subsystem.

8. The system of claim 5, wherein the first local subsystem is a flight control computer carried by the aircraft.

9. A method of controlling movement of an aircraft comprising:
  providing an aircraft comprising a first trust module, a first engine, and a second engine;
  programming the first trust module to review a first data stream;
  analyzing the first data stream by the first trust module; and
  deciding when to provide the first data stream to a first local subsystem based on the analyzing of the first data stream;
  wherein the deciding when to provide the first data stream to the first local subsystem affects operation of the aircraft during flight of the aircraft;
  programming a second trust module to review a first output data stream;
  analyzing the first output data stream by the second trust module; and
  deciding when to provide the first output data stream to a second local subsystem based on the analyzing of the first output data stream; and
  programming a third trust module to review a second output data stream;
  analyzing the second output data stream by the third trust module; and
  deciding when to provide the second output data stream to a third local subsystem based on the analyzing of the second output data stream;
  wherein the first output data stream relates to the first engine but not the second engine and wherein the second output data stream relates to the second engine but not the first engine.

10. The method of claim 9, further comprising:
  flagging the first data stream by the first trust module.

11. The method of claim 10, wherein flagged data is ignored by the first local subsystem.

12. The method of claim 10, wherein flagged data is replaced by the first trust module.

13. The method of claim 9, wherein the third local subsystem is isolated from the second local subsystem.

14. The method of claim 9, further comprising:
  analyzing the first local subsystem by the first trust module.

* * * * *